May 15, 1934. G. HANTJOPOULOS 1,958,966
AUTOMATIC CULTIVATOR AND PLANTER
Filed July 9, 1932 3 Sheets-Sheet 3
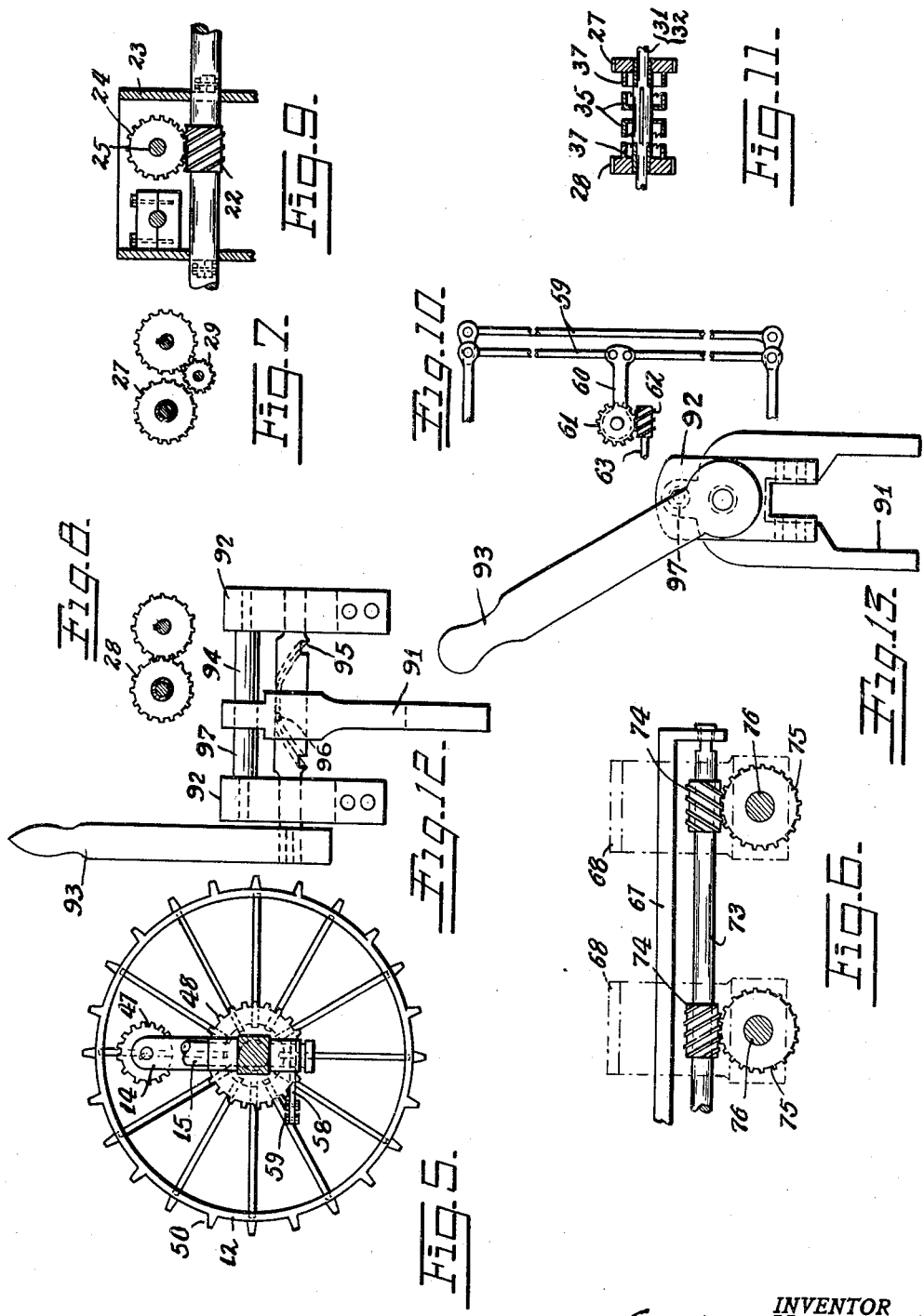
INVENTOR
George Hantjopoulos
BY
Zoltan T. Holachek
ATTORNEY Patented May 15, 1934

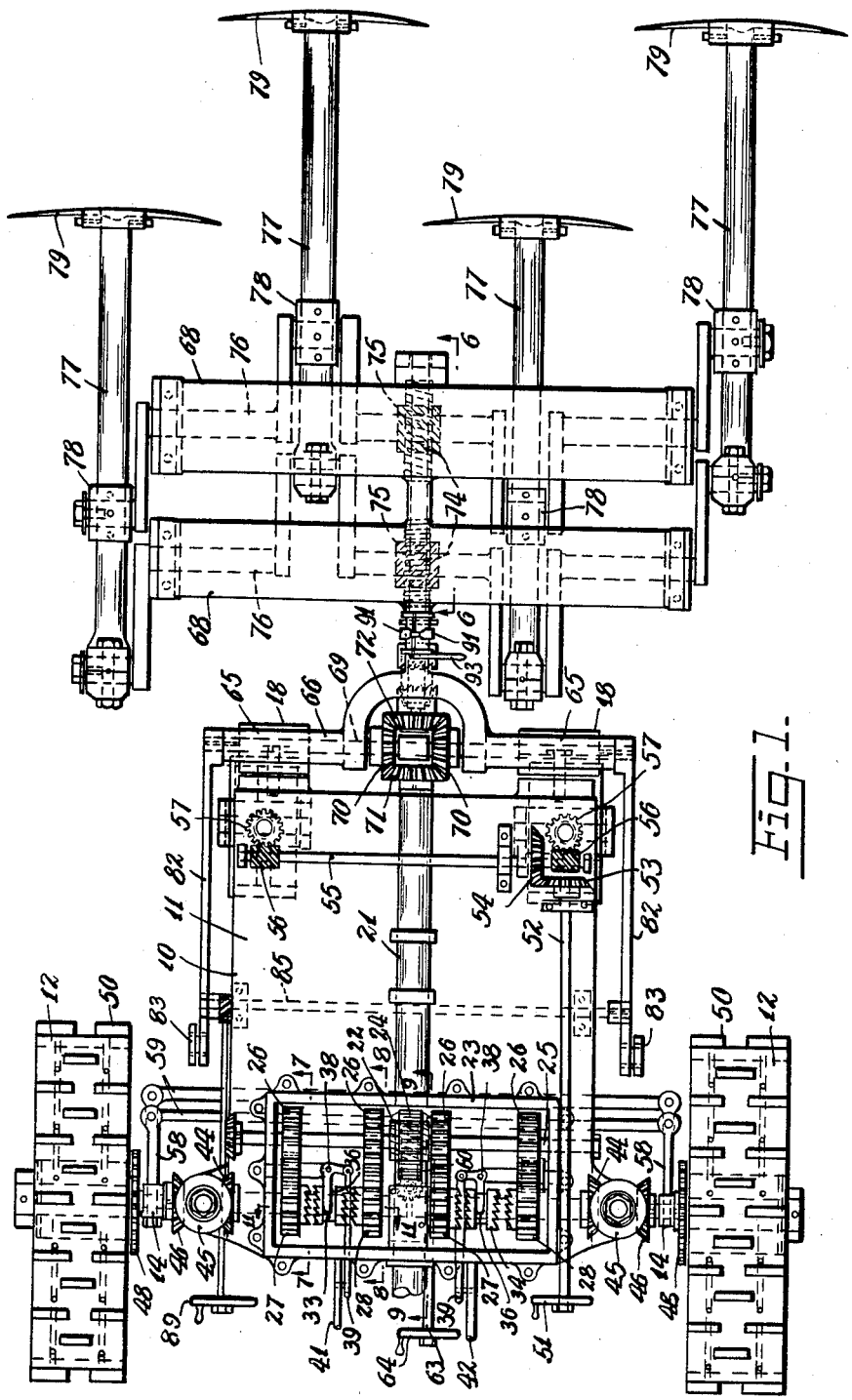

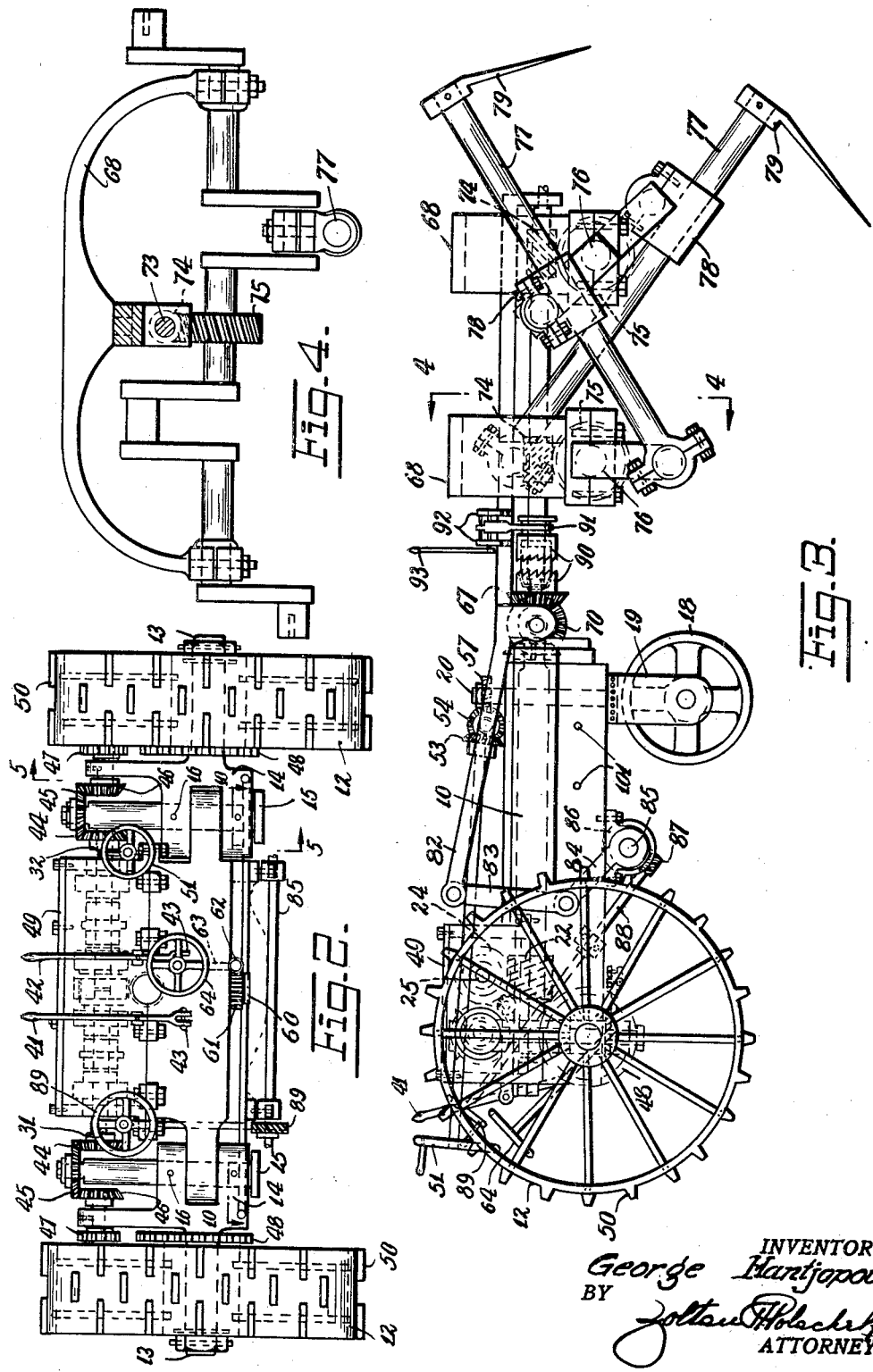

1,958,966

UNITED STATES PATENT OFFICE 1,958,966

AUTOMATIC CULTIVATOR AND PLANTER

George Hantjopoulos, New York, N. Y.

Application July 9, 1932, Serial No. 621,682

3 Claims. (Cl. 97—36)

This invention relates to new and useful improvements in an automatic cultivator.

The invention has for an object the construction of a device as mentioned which is characterized by the provision of an attachment whereby the device may do cultivating.

It is still further proposed to provide a body equipped with tractor wheels and front wheels, and the provision of means therewith for propelling said body, and further arranged to permit and cause the operation of a cultivator attachment.

Furthermore, it is proposed to provide a cultivator attachment which is characterized by the provision of transverse crank shafts spaced from each other and carrying rods provided with cultivating heads arranged in a manner so as to cause digging up of the earth during its operation.

A still further object of this invention is the construction of a simplified cultivator which is characterized by a frame on wheels, parallel crank shafts, cultivator heads connected for operation therewith, and a mechanism to cause operation of the crank shafts upon motion of the cultivator.

A still further object of this invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure,

Fig. 1 is a plan view of a device constructed according to this invention.

Fig. 2 is a rear elevational view of Fig. 1.

Fig. 3 is a side elevational view of Fig. 1.

Fig. 4 is a sectional view taken on the line 4—4 of Fig. 3.

Fig. 5 is a sectional view taken on the line 5—5 of Fig. 2.

Fig. 6 is a fragmentary sectional view taken on the line 6—6 of Fig. 1.

Fig. 7 is a fragmentary sectional view taken on the line 7—7 of Fig. 1.

Fig. 8 is a fragmentary sectional view taken on the line 8—8 of Fig. 1.

Fig. 9 is a fragmentary sectional view taken on the line 9—9 of Fig. 1.

Fig. 10 is a fragmentary sectional view taken on the line 10—10 of Fig. 2.

Fig. 11 is a fragmentary sectional view taken on the line 11—11 of Fig. 1.

Fig. 12 is an enlarged detailed view of the clutch coupling control shown in Fig. 3.

Fig. 13 is an end elevational view of Fig. 12.

The automatic cultivator and planter according to this invention comprises a body 10 having a flat platform 11 upon which a gasoline or other type of prime mover may be mounted. The body 10 is supported at the rear by traction wheels 12. These traction wheels are rotatively mounted upon wheel axles 13 integral with brackets 14 hingedly connected with the body 10 in a manner so that the brackets may swing about on vertical axes. This connection is obtained by inter-engaging parts from the body and the brackets and the provision of pintel bolts 15 engaged through these parts. These bolts are fixedly connected by pins 16 with the axle brackets 14 so that when the bolts are rotated the brackets will be correspondingly moved. At the front the body 10 is provided with wheels 18, rotatively mounted in brackets 19. The brackets 19 are fixed upon pintel shafts 20 rotative in the body 10 in a manner so that the front wheels may pivot about vertical axes. This arrangement allows steering.

A longitudinal drive shaft 21 is rotatively mounted upon the body 10 and is intended for connection with the prime mover. A means is provided for transmitting rotations from the shaft 21 to the traction wheels 12 and includes a mechanism for rotatively transmitting the motion to one or the other of the traction wheels or to both simultaneously and moreover is adapted to transmit the motion in a manner so as to cause the wheels to rotate frontwards or rearwards. This transmission means comprises a worm 22 fixed upon the shaft 21 connected with a clutch coupling and with gear housing 23 mounted upon a body 10.

The worm 22 meshes with a worm 24 fixed upon axle 25 extended transversely through housing 23. Four gears 26 are fixed upon the shaft 25. Each of the four gears mesh with trains of gears 27 and 28 respectively. These trains distinguish from each other in that the trains 27 have an extra gear indicated in Fig. 7 by reference numeral 29 so as to transmit rotations in one direction relative to the trains 28, shown in detail in Fig. 8, which are adapted to transmit the rotations in the opposite direction. The trains 27 and 28 are alternatively arranged and the last gears of the trains are fixed on shafts 31 and 32 respectively in connection for driving the wheels 12 as hereinafter further explained.

Clutch couplings 33 and 34 are interposed between the train of gears 27 and 28 in a manner so that one or the other of the trains may be connected with shafts to transmit the rotations. In Fig. 11 a detail of the clutch has been shown which comprises movable jaws 35 slidable upon the shafts 31 or 32 as the case may be but keyed upon the shafts so as to transmit rotations. These jaws are spaced from each other to allow a fork 36 to engage therebetween in a manner so that the jaws may be moved in an opposite direction in respectively connecting the shafts with one or the other trains of gears which have their adjacent faces formed with complementary clutch faces 37 to receive the jaws 35.

The forks 36 are pivotally mounted intermediately, at 38 upon projections from the housing 23 and are connected with levers 39 extended to the exterior of the housing and there connected intermediately with the ends of control handles 41 and 42 respectively. These control handles are pivotally mounted at their lower ends 43 upon the body 10 and are adapted to be moved at the upper ends to cause operation of the clutches. More particularly, when the handle 41 is moved one of the clutches will be operated to connect the train 27 or 28 with the shaft 31 driving one of the wheels 12, depending whether the handle is moved forwards or rearwards. Thus the particular wheel 12 may be caused to rotate forwards or rearwards. Correspondingly the other handle 42 may be moved so as to cause the other clutch to engage for connecting the shaft 32 to rotate forwards or rearwards depending upon whether the handle 42 is moved in corresponding position.

The shafts 31 and 32 are rotatively mounted and provided with bevel gears 44 meshing with horizontal bevel gears 45 rotatively mounted upon the bolts 15. These latter mentioned gears mesh with the other bevel gears 46 fixed upon studs rotatively mounted in the brackets 14 and carrying at their other ends gears 47 adapted to receive driving chains for causing gears 48 fixed upon the wheels 12 coaxially, to rotate. Particular attention is called to the arrangement whereby rotations may be transmitted to the wheels 12 irrespective of their positions relative to the pivotal arrangement between the brackets 14 and the body 10. In Fig. 2 a cover 49 is shown closing the top of the housing 23. The wheels 12 are provided with peripheral projections 50 adapted to grip the ground during operation of the device.

A means is provided to steer the device and comprises a mechanism whereby the front wheels 18 may be turned right or left. This means comprises a hand wheel 51 fixed upon a shaft 52 rotatively mounted upon the body 10 and carrying a bevel gear 53 in mesh with a bevel gear 54 upon a shaft 55 rotatively and transversely mounted on the body 10. The shaft 55 is provided with worms 56 meshing with other worms 57 fixed upon the vertical shafts 20 which are connected with the brackets 19 of the wheels 18. Thus the handle 51 may be turned in one direction to transmit motion which turns the wheels 18 towards the right, for example, or towards the left, and vice versa, to cause steering.

To further provide for steering of the device a control has been provided to horizontally turn the rear wheels 12. This means comprises arms 58 projecting from the axle brackets 14 and connected with links 59 which serve to join the arms 58 for unitary motion. One of the links 59 is provided with an extension 60 radially fixed upon a worm 61 rotatively mounted and meshing with another worm 62 upon a shaft 63 rotatively supported on the body 10 and terminating at the rear in a control handle 64.

A cultivator attachment is secured upon the front of the body 10 and comprises bearing blocks 65 secured upon the front edge of the body 10. A yoke 66 is extended through the bearing blocks 65 and supports a frame which comprises a longitudinal member 67 and transverse members 68 spaced from each other. A shaft 69 rotatively engages through the yoke 66, transversely, and is provided with the bevel gears 70 meshing with a bevel gear 71 fixed upon the driver shaft 21. Another bevel gear 72 is in mesh with the bevel gears 70 and is idle upon the cultivator shaft 73 which is rotatively supported upon the longitudinal portion 67. A pair of worms 74 are fixed upon the shaft 73 and mesh with worms 75 fixed upon a pair of parallel spaced crank shafts 76 which are rotatively supported in the transverse portions 68. Each of the crank shafts are shown with several crank portions, namely four in number, this not being intended as a limitation.

A plurality of rods 77 are journalled at their rear ends upon the cranks of the rear shaft 76 and slidably pass through bearing blocks 78 mounted upon the cranks of the front shaft 76. The arrangement is such that when the shafts 76 are caused to rotate the rods 77 will travel through an arcuate path in which the front ends move downwards and upwards during each cycle. The worms 74 upon the shaft 73 are of different hands, so as to cause the crank shafts to rotate in opposite directions. In Fig. 3 the rods are shown in two phases, namely one phase with certain of the rods raised and the other phase in which they are lowered.

A means is provided for raising or lowering the yoke 66 about the bearing blocks 65 and comprise radial arms 82, fixed radially upon the ends of the yoke and extending rearwards. These radial arms connect with links 83 in turn connected with crank arms 84 fixed upon a transverse shaft 85 secured beneath the body 10. A worm 86 is fixed upon the shaft 85 and meshes with another worm 87 fixed upon a shaft 88 rotatively mounted upon the body 10 and terminating at the rear end in a hand control wheel 89. Upon turning of the wheel 89 the radial arms 82 will be pivoted and correspondingly pivot the frame of the cultivator about on the bearing blocks 65.

On shaft 73 the clutch coupling 90 is composed of two sections and is provided with a movable keyed jaw adapted to be connected for unitary motion by the fork 91. The fork 91 is caused to operate by reason of its engagement on brackets 92 secured upon the frame 67. The details of the fork and its mounting is shown in Figs. 12 and 13. A handle 93 is fixed upon a shaft 94 rotative in the brakets 92. The shaft 94 is provided with a cam slot 95 engaged by a pin 96 projecting from the fork 91. The upward end of the fork 91 engages a guide rod 97 extended across the brackets 92. Thus upon operation of the handle 93 the cultivator may be connected for operation or disconnected from the drive shaft 21.

While I have shown and described the preferred embodiment of my invention, it is to be understood that I do not limit myself to the precise construction herein disclosed and the right is reserved to all changes and modifications coming within the scope of the invention as defined in the appended claims.

Having thus described by invention, what I claim as new, and desire to secure by United States Letters Patent is:—

1. An automatic cultivator, comprising a tractor having a body with a front edge and a driver shaft at right angles to said front edge, a yoke attached upon said front edge, and supporting a frame comprising a longitudinal member connected with a pair of transverse spaced members, a shaft rotative through said yoke and fixedly supporting bevel gears meshing with a bevel gear on said driver shaft, a shaft rotative through said longitudinal member and having a fixed bevel gear meshing with the bevel gears upon the shaft through said yoke, spaced parallel crank shafts rotatively supported upon said transverse members, worms on said shaft through said longitudial member and meshing with worm wheels on said spaced parallel crank shafts, rods journalled at their rear ends on the cranks of the rear crank shaft of said crank shafts and slidably through bearing blocks rotative on the cranks on the front crank shaft, and cultivator implements upon the front ends of said rods.

2. An automatic cultivator, comprising a tractor having a body with a front edge and a driver shaft at right angles to said front edge, a yoke attached upon said front edge, and supporting a frame comprising a longitudinal member connected with a pair of transverse spaced members, a shaft rotative through said yoke and fixedly supporting bevel gears meshing with a bevel gear on said driver shaft, a shaft rotative through said longitudinal member and having a fixed bevel gear meshing with the bevel gears upon the shaft through said yoke, spaced parallel crank shafts rotatively supported upon said transverse members, worms on said shaft through said longitudinal member and meshing with worm wheels on said spaced parallel crank shafts, rods journalled at their rear ends on the cranks of the rear crank shaft of said shafts and slidably through bearing blocks rotative on the cranks on the front crank shaft, and cultivator implements upon the front ends of said rods, said shaft through the longitudinal member comprising shaft sections connected with a clutch.

3. An automatic cultivator, comprising a tractor having a body with a front edge and a driver shaft at right angles to said front edge, a yoke attached upon said front edge, and supporting a frame comprising a longitudinal member connected with a pair of transverse spaced members, a shaft rotative through said yoke and fixedly supporting bevel gears meshing with a bevel gear on said driver shaft, a shaft rotative through said longitudinal member and having a fixed bevel gear meshing with the bevel gears upon the shaft through said yoke, spaced parallel crank shafts rotatively supported upon said transverse members, worms on said shaft through said longitudinal member and meshing with worm wheels on said spaced parallel crank shafts, rods journalled at their rear ends on the cranks of the rear crank shaft of said crank shafts and slidably through bearing blocks rotative on the cranks on the front crank shaft, and cultivator implements upon the front ends of said rods, said worms being of different hands so as to cause the crank shafts to rotate in different directions.

GEORGE HANTJOPOULOS.